Patented Mar. 30, 1926.

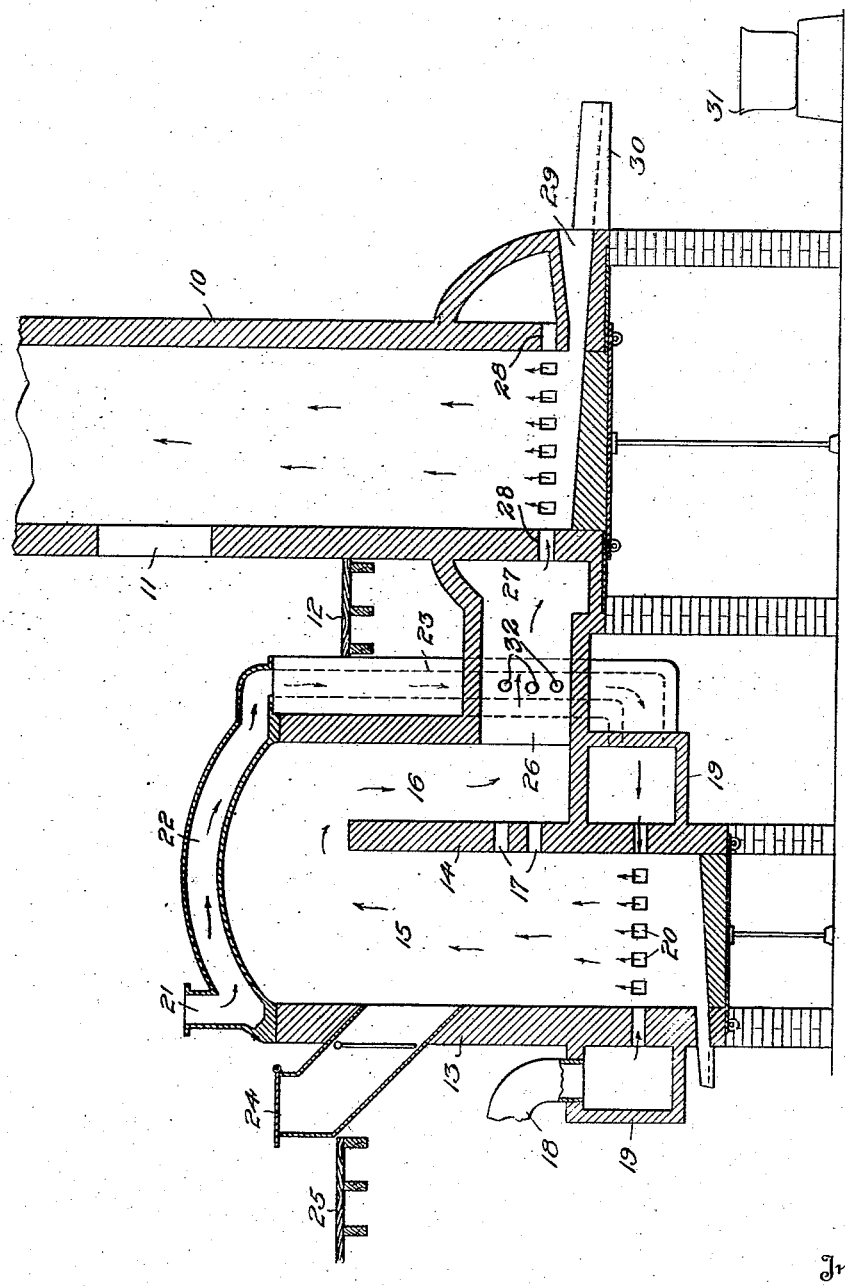

1,578,648

UNITED STATES PATENT OFFICE.

YULEE ALISON DYER, OF CAVE SPRING, GEORGIA.

METHOD OF MELTING METALS.

Application filed May 5, 1925. Serial No. 28,138.

*To all whom it may concern:*

Be it known that I, YULEE ALISON DYER, a citizen of the United States, residing at Cave Spring, in the county of Floyd and State of Georgia, have invented certain new and useful Improvements in Methods of Melting Metals; and I do hereby declare the following to be a full, clear, and exact description of the same, reference being had to the accompanying drawing, forming part of this specification.

This invention relates to a method of melting various metallic substances which might be unduly contaminated if the molten metal should be permitted to trickle through the usual copious quantities of solid carbonaceous material which forms the bed in present cupola or furnace processes. This melting process particularly relates to the melting of pig iron and iron scrap for pouring into castings.

In melting pig and scrap metal for the production of strong, tenacious castings it is particularly desirable to maintain the total carbon content at between 2.85 percent and 3.00 percent. When pig iron and scrap metal are melted in present type cupola or furnace, in contact with copious quantities of solid coke or coal or other carbonaceous material, the resultant molten metal absorbs carbon and sulphur from the high fuel bed to an objectionable degree, often resulting in subsequent treatment to eliminate, or lower, these objectionable elements.

In practising my invention the iron or metal to be melted is largely heated by contact with hot gases which are generated in a separate chamber, by the burning of carbonaceous material therein, and blown over into the melting cupola or furnace under mechanically forced pressure ranging from one-fourth to one and one-half pounds per square inch. These hot gases pass from the chamber into the adjoining furnace or cupola and are forced through, or under, up and through, exceedingly thin layers of solid carbonaceous material and up through very large layers of metal which are alternately arranged in the usual manner of charging a cupola or furnace; that is, by placing at the bottom of said cupola or furnace a thin layer of said carbonaceous material above which are alternately placed any number of large layers of iron or other metal to be melted and thin layers of carbonaceous material. Therefore, the pig iron and scrap metal (by reason of being out of contact with the usual deep layers of solid carbonaceous material) are melted in a zone of contracted depth—the total carbon content of the molten metal being thereby lowered and excessive absorption of sulphur being precluded.

The process may be carried out in various types of apparatus—the form shown in the figure being illustrative only and highly diagrammatic. The figure is a general cross section partly in side elevation through the combustion chamber and cupola. The cupola or furnace 10 is of the usual high type; the pig iron and scrap being fed in through the charging door 11 in any desired manner—a standard charging floor 12 being provided.

The cupola or furnace is largely heated by the hot gases blown over, under mechanical pressure, from the detached chamber 13. This chamber may be of any desired size and shape, and may be provided with a vertical baffle wall 14 separating the chamber into a major portion 15, in which coke or other fuel is burned, and a much smaller passageway 16 down which the hot gases are forced by mechanical pressure, or the gases may be made to pass through open spaces 17 in baffle wall under mechanical pressure by extending baffle wall and sealing it to dome of chamber. In either event the movement of the gases is highly accelerated by a positive blower delivering natural air through windpipe 18 connected to windbox 19 circling, or partially circling bottom of chamber 13—the air passing into hearth of chamber through a series of tuyères 20. Natural air may also be delivered directly from blower to windbox 21—which, together with a series of pipes 22, form the dome of chamber 13. By this manner the natural air is delivered through pipes 22 and down through conduits 23 to belt 19 (in which case would be lined with refractory material) and thereby becomes heated to a high degree before passing through tuyères 20 into chamber hearth by reason of the generated gases in chamber impinging on the exposed pipe and conduit surfaces as they pass to gas belt main 26—the process thereby serving as a novel recuperating system. Coke or other fuel is fed to the chamber through inlet 24, located at a convenient distance above charging floor—25—the feeding of the coke being either by hand or by mechanical device.

As the gas formed by the combustion of the fuel attains a temperature of between 600° and 1900° F. and as it passes down the portion 16, or through portion 17, it is forced through the relatively small passageway 26 into the gas belt 27 which entirely or partially surrounds the bottom of cupola or furnace 10, and being connected with its hearth by a plurality of gas ports 28, located just above bottom of the cupola or furnace. The cupola or furnace bottom slopes downwardly towards its open tap hole 29, through which the molten metal flows to trough 30 for delivery to ladle 31. The operation is as follows: A large charge of iron, metal or other material to be melted is first placed on top of a very small bed of coke or other carbonaceous material in cupola or furnace 10, the coke, or other carbonaceous material, bed reaching from bottom to only a few inches above ports 28. Large charges of metal are subsequently placed above thin intermediate charges of coke, or other carbonaceous material—the fuel thus charged will maintain the coke, or other carbonaceous material, bed at a constant position during melting operations. Large volumes of gas generated in chamber 13 are then mechanically forced through the coke, or other carbonaceous material, bed in cupola or furnace 10 and up through thin layers of coke or other carbonaceous material and large layers of iron metal or other material to be melted which are superincumbent on bed of coke or other carbonaceous material. Some excess or free oxygen is also introduced by jets from conduits 23 along with the hot gases as they pass through gas main 26 to create a maximum of carbon dioxide gas and the correct quantity of oxygen for heating and combustion in cupola or furnace 10. This condition results in materially lowering the total carbon content of the metal by oxidation, and inasmuch as the molten metal passes through a very thin layer of solid carbon on its descent to the furnace hearth, both its time lag in descent through, and its contact with, solid carbon precludes the excessive re-absorption of carbon from the solid carbon and absorption of sulphur from the coke ash or other carbonaceous fuel ash.

In ordinary practice the action of the cupola increases the percent of sulphur already present in the iron—due to the fact that the coke or other solid carbon is invariably high in order to maintain a constant high heat, but under my process the bulk of heat supplied to the metal is due to the hot gases thrown over from the chamber, therefore the quantity of sulphur present from that source is negligible. The total carbon content of the usual pig iron is from 3.50 percent to 3.60 percent, and this percentage is unaltered by the ordinary melting process in vogue at this time.

What I claim is:

1. The process of melting iron, metal and other materials which consists in burning a body of carbonaceous material, at a point removed from and out of physical contact with the body of iron, metal, or other material to be melted, to form a large volume of hot gases, conveying said gases to a furnace or cupola containing very thin layers of carbonaceous material and large layers or iron, metal, or other material to be melted.

2. The process of melting iron or other metals which consists in burning a body of carbonaceous material at a point remote from the body of iron or other metals to be melted, and in the presence of a mechanically forced volume of air to form gases, conveying said gases by mechanical pressure to a chamber containing the mass of iron or other metals to be melted, and passing said volume of gases by mechanical pressure on and through, or under, up and through, said mass of iron or other metals which is superincumbent on very thin layers of solid fuel.

3. The process of melting iron or other metals which consists in burning a body of carbonaceous material at a point remote from the body of iron or other metals to be melted and in the presence of a volume of air forced mechanically under a pressure of not less than one-fourth pound and not more than one and one-half pounds to the square inch to form gases, thence conveying said gases under and by a mechanical pressure of not less than one-fourth pound, and not more than one and one-half pounds, to the square inch to a chamber containing the mass of iron or other metal to be melted and passing said volume of gases under said mechanical pressure against and through, or under, up and through, said mass of iron or other metals to be melted which is superincumbent on very thin layers of solid carbonaceous material.

4. The process of melting iron or other metals which consists in burning bodies or particles of carbonaceous material at a point remote and in a separate chamber from the body of iron or other metals to be melted, which carbonaceous material is burned in the presence of a mechanically forced volume of air to form gases, thence conveying said gases under and by mechanically forced pressure ranging from one-fourth pound to one and one-half pounds per square inch to a cupola or furnace containing the mass of iron or other metals to be melted and directing and passing said volume of gases under said mechanical pressure ranging from one-fourth pound to the square inch to one and and one-half pounds to the square inch against and through (or under, up and through) said mass of iron or other metals to be melted, each layer of which iron or other metals is superincumbent on a very thin layer of solid fuel.

5. The process of melting iron or other metals which consists in burning a body or bodies, or particles, of carbonaceous material at a point remote and in a separate chamber from the body of said iron or other metals to be melted, which burning is done in the presence of a volume of air (under mechanically forced pressure of not less than one-fourth pound and not exceeding one and one-half pounds per square inch) to form gases, thence conveying under said mechanical pressure said gases (to which is added a small amount of free oxygen when desired) to a cupola or furnace in which there has been placed the iron or other metals to be melted and bodies of carbonaceous material arranged so that a layer of said carbonaceous material is at the bottom of said cupola or furnace and on the top of said carbonaceous material there has been placed a layer of said iron or metal to be melted on the top of which there are alternate layers of carbonaceous material and iron or metal to be melted, and thence passing said volume of gases under said mechanical pressure against and through, or up and through, first a mass or body of said carbonaceous material in said cupola or furnace and thence together with the additional gases or heat units thereby obtained against and through, or up and through, the said masses of iron or other metals to be melted which are superincumbent on very thin layers of solid fuel.

6. The art of producing a molten metal for castings which consists in charging a furnace or cupola with pig iron, or pig iron and scrap iron or other metal, the total carbon content of which is too great to conform with a high transverse and tensile strength—placing underneath said iron or other metal charges very thin layers of carbonaceous material—then melting iron or other metal charge by directing at or near its bottom highly heated gases and free oxygen obtained under mechanical pressure from an adjacent chamber or chambers, together with the additional heat units obtained from thin layers of carbonaceous material underlying said layers of iron or other metals in the cupola or furnace.

7. The art of producing a molten metal for castings which consists in charging a furnace or cupola with pig iron or with other metals or with pig iron and other metals combined, placing underneath each layer of said iron or other metal to be melted, or said iron and other metal combined, a thin layer of carbonaceous material, then melting the total iron or metal charge contained in said cupola or furnace by directing and forcing against and through, or up and through said charge highly heated gases and free oxygen, which heated gases are obtained under mechanical pressure from an adjacent chamber, which mechanical pressure shall be not less than one-fourth pound and not more than one and one-half pounds per square inch.

8. The process of melting iron or other metals which consists in burning a body or particles of carbonaceous material at a point remote from the body of iron or other metals to be melted, which carbonaceous material is burned in the presence of a volume of air forced under mechanical pressure of not less than one-fourth pound and not exceeding one and one-half pounds per square inch to form gases, conveying said gases under and by said mechanical pressure, together with some free oxygen which have been mingled with said gases, to a cupola or furnace containing masses of iron or other metals to be melted under each of which said masses of iron or other metal to be melted is a thin layer of carbonaceous material and thence passing and directing said volume of gases and free oxygen under and by said mechanical pressure against and through, or up and through, first one of said thin layers of carbonaceous material and thence against and through the upper alternate masses of iron or other metal to be melted and said thin layers of carbonaceous material.

9. A continuous and automatic process of melting iron or other metals which consists in generating carbon dioxide gas from a body or particles of carbonaceous material at a point remote from and out of physical contact with the body of iron or other metals to be melted, passing said gas, together with some free oxygen, under mechanical pressure ranging from one-fourth pound to one and one-half pounds per square inch to a cupola or furnace, containing a layer or layers of iron or other metal to be melted, under each of which layer, or layers, of iron or other metal there is a thin layer of carbonaceous material, and thence passing and directing said volume of gases and free oxygen under and by said mechanical pressure against and through, or up and through, first, one of said thin layers of carbonaceous material and thence against and through the upper alternate masses of iron or other metal to be melted and said thin layers of carbonaceous material.

10. The process of continuously and automatically melting iron or other metals, which consists in charging one combustion chamber with a comparatively deep bed of carbonaceous material, which is at all times out of physical contact with the iron or metal to be melted, combusting said carbonaceous material in the presence of a supply of air, thereby creating carbon dioxide gas, and then conveying by or under mechanical pressure the hot gas thus formed over or through a baffle wall within said chamber and then out of and from said chamber directly to a cupola or furnace, and there passing said hot gas under, up and through a layer of carbonaceous material which is thin as compared to the layers of similar material used in present methods of melting metals in a cupola, immediately above and adjacent to which layer of carbonaceous material is a layer of iron or other metal to be melted, to which said hot gases there is added, during the passage of said hot gases from said combustion chamber to said cupola, or furnace, a small amount of natural air or free oxygen.

11. The process of melting iron or other metals, which consists in charging one combustion chamber with a comparatively deep bed of carbonaceous material, combusting said material in the presence of a supply of air which has been preheated to a temperature of approximately 600 degrees F., but not exceeding 1900 degrees F., conveying the hot gases formed from such combustion directly to a second combustion chamber, introducing a supply of additional air to said gases at a point intermediate the two chambers, and then passing said gases and additional air under, up and through, and against the lower exposed face of the lowest thin-gauged layer of carbonaceous material above and adjacent to which is superimposed the iron or metal to be melted, the second combustion chamber being charged with either one or several layers of iron or other metal to be melted under each layer of which iron or metal to be melted is a comparatively thin-gauged layer of carbonaceous material as compared with similar layers used in the methods now in use, in cupolas and which said gases are conveyed from said first combustion chamber to the second combustion chamber under mechanical pressure of not less than one-fourth of a pound to the square inch and not exceeding one and one-half pounds to the square inch, as is desired, and which said natural air used in the combustion of said carbonaceous material in the first or primary combustion chamber is preheated by forcing such natural air directly from a blower to a windbox which leads into a series of cast iron, steel or refractory pipes or conduits forming the dome of such primary or first combustion chamber, thereby creating a continuous recuperating unit which preheats the natural air after combustion has been set up in such first or primary combustion chamber and as the hot gases are forced to the dome of said first or primary combustion chamber in their passage from such combustion chamber to the second combustion chamber, thus materially lowering the consumption of carbonaceous material in such process by having the blast enter the tuyères of the first combustion chamber at a temperature of approximately 600 degrees F. and upward, and thus permitting of a longer period of operation by minimizing troublesome bridging in the primary combustion chamber from cold slag.

YULEE ALISON DYER.